United States Patent [19]

de Valroger

[11] Patent Number: 4,485,310
[45] Date of Patent: Nov. 27, 1984

[54] COMBINATION OF A COMPRESSION OR EXPANSION TURBINE ENGINE AND AN ELECTRIC MOTOR

[75] Inventor: Pierre de Valroger, Paris, France

[73] Assignee: Valbrev (Société à Respondabilité Limitée), Paris, France

[21] Appl. No.: 372,546

[22] Filed: Apr. 28, 1982

[30] Foreign Application Priority Data

Apr. 30, 1981 [FR] France .................. 81 08683

[51] Int. Cl.³ .................. H02K 7/08; H02K 7/18
[52] U.S. Cl. .................. 290/52; 310/90
[58] Field of Search .................. 290/52; 310/90, 254

[56] References Cited

U.S. PATENT DOCUMENTS

| | | | |
|---|---|---|---|
| 3,806,785 | 4/1974 | DeValroger et al. | 318/254 |
| 3,961,199 | 6/1976 | Bronicki | 290/52 |
| 4,253,031 | 2/1981 | Krister | 290/52 |
| 4,286,187 | 8/1981 | Binder | 310/90 |
| 4,394,582 | 7/1983 | Kreissl et al. | 290/52 |

*Primary Examiner*—Stanley J. Witkowski
*Assistant Examiner*—Shelley Wade
*Attorney, Agent, or Firm*—Watson, Cole, Grindle & Watson

[57] ABSTRACT

A motor generator set utilizing a compression or expansion turbine engine. Fixed to the shaft of this turbine engine are the drive and pick-up rotors of a brushless direct-current motor with permanent magnets, the turbine engine bearings serving also as bearings for the electric motor. Application to the momentary or continuous supercharging of reciprocating heat engines, to gas turbine power plants, to cryogenic units and to all plant installations utilizing a compression and/or expansion turbine.

7 Claims, 9 Drawing Figures

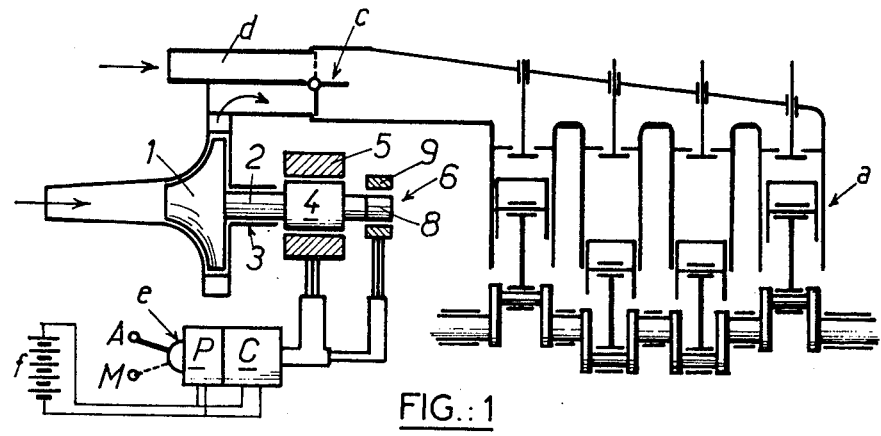
FIG.:1
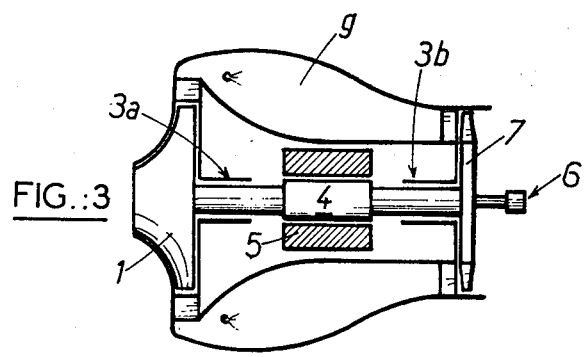
FIG.:3
FIG.:2
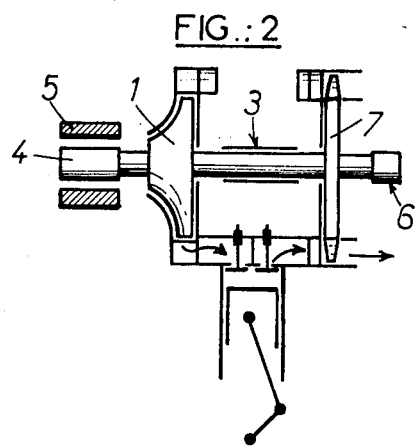
FIG.:4
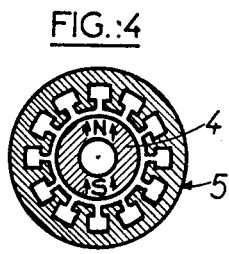

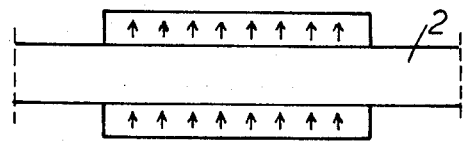 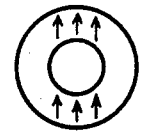
FIG.:5  FIG.:5a
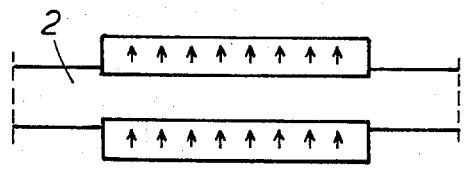 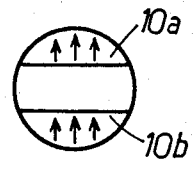
FIG.:6  FIG.:6a
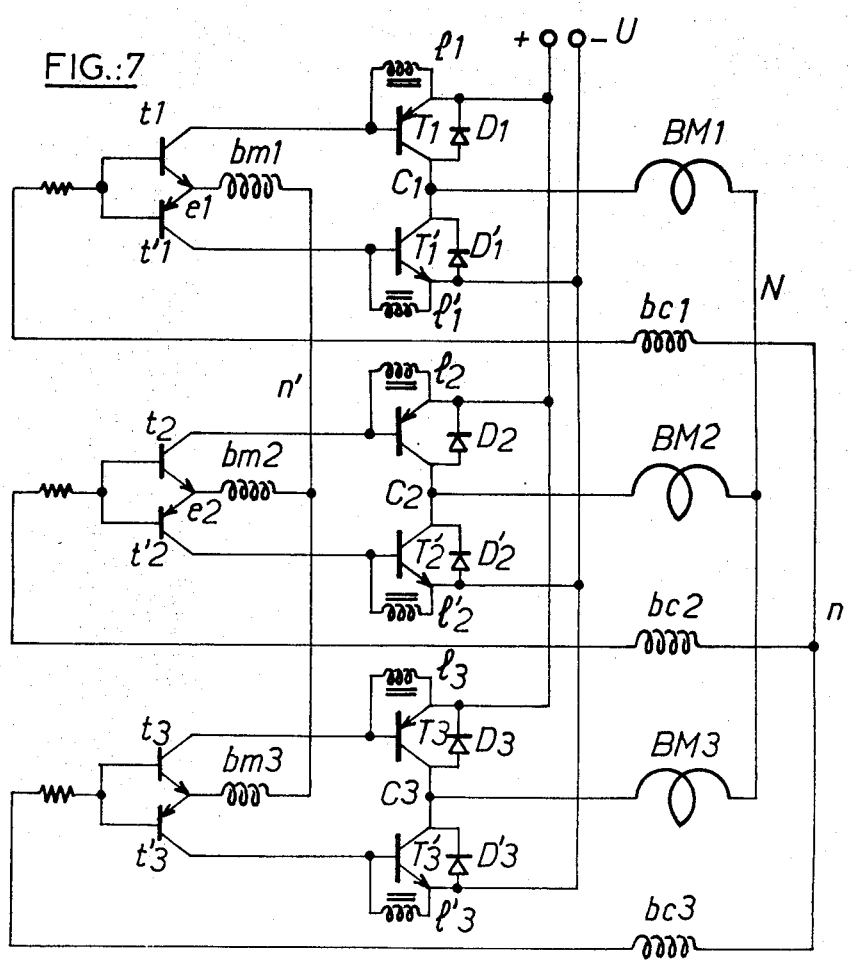
FIG.:7

COMBINATION OF A COMPRESSION OR EXPANSION TURBINE ENGINE AND AN ELECTRIC MOTOR

As is known, the coupling of a compression or expansion turbine engine and an electric motor presents technical difficulties. This is because the turbine engine and the electric motor each have their own bearings, which are precision-machined so as to adjust the air gaps and reduce them to a minimum in the case of the electric motor. The solution which consists in aligning the shafts of the two machines in order to couple them directly has to be discarded as it would be necessary to align precisely more than two bearings, which is not feasible at the industrial level. This in turn requires providing costly and heavy motion transmitting mechanisms.

Likewise known are brushless direct-current electric motors, the rotors of which have permanent magnets while the stator windings are switched by a transistorized device activated in synchronism with the rotation of the rotor.

Such a motor is derived from the synchronous motor, but instead of having the fixed frequency of an electric power system, the rotating field set up by the stator coils is generated, at the frequency of rotor rotation, by the action of a rotor RPM detector and a transistorized device controlled by said detector and termed a pick-up.

Such a motor can be devised to have starting torque and cannot fall out of step. It is self-synchronous.

Such reversible and extremely efficient motors making use of the six-transistor Lavet switching system were described in U.S. Pat. No. 3,806,785 (de VALROGER and LAVET).

These motors can achieve very high rotation speeds and, rather surprisingly a priori, will not only tolerate much larger air gaps than other electric motors, but indeed require large air gaps to function properly.

The combined compression or expansion turbine engine and electric motor of the present invention is characterized in that the electric motor is a brushless direct-current electric motor of the type referred to above and in that the rotor of this motor is integrated into the shaft of the turbine engine, whereby the electric motor employs the anti-friction bearings of the turbine engine.

This very simple, low-cost combination, which overcomes the problem of the electric motor bearings, had not occurred to the respective specialists in the turbine-engine art and the electric-motor art, who are differently trained.

It should be added that such a combination is the inverse of that consisting in mounting a turbine on an electric motor shaft to ventilate the motor, as is the common practice. The subject combination of this invention accords preference to the turbine and its bearings, which is essential in the case of turbine engines. This makes it possible to reduce clearances in such turbine engines and not to sacrifice their efficiency, whereas relatively large clearances can be tolerated between the rotor and the stator of a self-synchronous motor, such clearances being in fact essential to efficient operation of such an electric motor, as already stated.

The present invention is capable of numerous practical applications.

A first application concerns the starting up of turbine engines, since compression or expansion turbines require to be spun up fairly rapidly before they will start. Brush-type motors have been used for the purpose but require step-up gear trains. Not only are these avoided with the combination of this invention, but also the inertias involved are reduced, thereby speeding up the start up process.

Another application is for starting supercharged two-stroke internal combustion engines. Without supercharging, such an engine cannot start when cold. A turbo-electric set according to this invention could then supply the cylinders with the compressed air needed for starting, using an existing electric power source.

A somewhat different application involves "boosting" a supercharged reciprocating internal combustion engine, particularly on automobiles. A momentary current draw from the vehicle's battery allows spinning up the turbo-compressor rapidly and, consequently, the reciprocating engine. This shortens the time which elapses between the moment the driver depresses the accelerator pedal and the moment the engine picks up speed.

This last application may also be of concern to non-supercharged reciprocating internal combustion engines. A self-contained turbo-electric unit according to this invention, in this case powered solely by the battery being recharged by the internal combustion engine, can provide momentary supercharging to the engine, thereby causing a rapid buildup in its speed and consequently improving acceleration.

It should be noted that in these applications the call for power delivered by the electric motor to the turbo-compressor has a multiplying effect, since far greater power is delivered by the shaft of the reciprocating heat engine than is drawn from the battery.

Furthermore, the makeup power provided by an external source of electrical energy, suitably proportioned according to engine RPM, can enable the supercharging of combustion engines to be better exploited. Not only is the power boosted, but one can then achieve much better efficiency. For, as is well known, supercharging compressors which are controlled solely by the exhaust gases are not very well adapted.

Such boosted power and improved adaptation were achieved recently by using an auxiliary combustion chamber operating between the compression turbine and the expansion turbine, this system being termed the "Hyperbar". Advantage is taken of this to suitably reduce the volumetric ratio of the reciprocating engine—usually a Diesel engine. Application of the present invention then allows dispensing, wholly or partly, with the external combustion chamber, the self-synchronous electric motor operating continuously so as to deliver, at rotation speeds of which it is capable (40,000 RPM, for example), the added power to enable turbine engines and particularly compressors to operate at the speed ensuring optimum efficiency.

Since electric motors of the type considered herein are reversible, the present invention includes in its scope their application as current generators, thereby possibly avoiding the need to install a special dynamo.

However, applications of the self-synchronous motor for driving compression and expansion turbines are much vaster and indeed embrace all machines in which such turbines are employed. A case in point concerns cryogenic units which make it possible, in successive steps, to achieve temperatures close to absolute zero.

Another example is provided by heat pumps driven by turbine sets.

In all these applications it is important for the electric motor used to be efficient and capable of rotating at high speeds. The various embodiments to be described hereinbelow were conceived accordingly, in respect both of mechanical engineering and electronics. By way of example, a wiring layout is given which is applicable to low-voltage powered self-synchronous motors with inductive pick-ups, which is typical of motor vehicles.

The description that follows with reference to the accompanying non-limitative exemplary drawings will give a clear understanding of how the invention can be carried into practice.

In the drawings:

FIG. 1 shows diagrammatically the simplest kind of turbo-electric unit according to this invention.

FIG. 2 and FIG. 3 are schematic illustrations of alternative embodiments.

FIG. 4 is a sectional view of the electric motor.

FIGS. 5 and 5a illustrate a homogeneous onepiece rotor, and FIGS. 6 and 6a a rotor with fitted magnetized segments.

FIG. 7 depicts a wiring layout for switching electronics with an inductive pick-up, having recovery windings and blocking inductors.

Reference to FIG. 1 shows a compression turbine 1, in this case of the centrifugal type, carried on a shaft 2 rotatably supported in a single bearing 3. The rotor 4 with permanent magnets of a self-synchronous electric motor of the type hereinbefore specified is mounted on shaft 2 and is surrounded by a conventional three-phase stator 5. The inductive pick-up 6 for activating the switching electronics feeding the stator is mounted on the end of the shaft. FIG. 4 is a radial section of the electric motor with its rotor 4 (assumed to be bi-polar) and its stator 5 depicted in this case as having twelve poles and the usual indents for receiving the windings (not shown), which windings are supplied with alternating current from a direct-current source, through the agency of the pick-up 6 and transistorized flip-flops controlled by said pick-up. All this was in fact already described in detail in the said U.S. Pat. No. 3,806,785. Inductive pick-up 6 is formed by a small bi-polar magnetized rotor similar to electric motor rotor 4. Rotor 8 is fixed to the end of the shaft and surrounded by a small three-phase stator 9, the angular setting of which is adjustable. The three windings of the pick-up stator are designated bc1, bc2 and bc3 on FIG. 7, which shows their manner of connection, while the coils of the motor stator are designated BM1, BM2 and BM3.

In contrast to the usual asynchronous motors, adapting the compressor 1 is easy owing to the functional characteristics of self-synchronous motors of the type herein considered, whose torque increases as their speed decreases. Further, even very high speeds are possible because of the very short switching times of the transistors.

In FIG. 1 it has been assumed that the invention is applied to the momentary supercharging of a reciprocating internal combustion engine, such as an automobile engine represented schematically at a. A valve c is placed in the position shown in a solid line during the periods of supercharging of engine a which then sucks in atmospheric air through the freely open air duct d, the compressor 1 being halted.

When it is desired to boost engine a, in order to accelerate for example, the compressor 1 is set in rotation. This is accomplished by placing the lever of switch e in the ON position M in order to energize the coils of electric motor stator 5 via the vehicle's main battery f. At the same time, valve c is placed in the position shown by the dotted line wherein it blanks off the air duct d and communicates the delivery end of compressor 1 with the feed to engine a.

In such an application, the present invention provides a very simple mechanical combination since no bearing is added to the single compressor bearing.

In the event that a self-synchronous electric motor with inductive pick-up is used, the starting torque will be obtained through the agency of an electronic device termed a "permutator", such as described in U.S. Pat. No. 4,027,213 (de VALROGER and LAVET). The same will apply to all other applications in which the motor with inductive pick-up is required to have a starting torque.

The permutator, which operates by means of transistorized electronic flip-flops associated to the respective stator windings of the motor, as described in said patent, allows switching the current in said windings and consequently creating an alternating field that causes the motor to start. As soon as a certain speed threshold is reached, the inductive pick-up becomes operative but the permutator can remain in circuit to control the power transistors feeding the electric motor windings, with the advantage that the switch e used to start and stop the electric motor is able to act on the supply to the permutator, that is to say on weak currents.

Reference to FIG. 2 shows two turbines, one of them a centrifugal type compression turbine 1, the other an axial type expansion turbine 7. The shaft common to the two turbines rotates in a single bearing 3 placed between the turbines. The rotor 4 of the electric motor is at one end of this shaft and the rotor of pick-up 6 at the opposite end thereof.

In this example, it has been further assumed that the unit is applied to the supercharging of a two-stroke reciprocating heat engine with fuel injection and scavenging, with the turbine 7 receiving the exhaust gases from this engine and the compressor 1 delivering air under pressure into the inlet tract of said engine.

In the arrangement shown in FIG. 3, the shaft 2 common to compression turbine 1 (assumed to be of the centrifugal type) and to expansion turbine 7 (assumed to be of the axial type) rotates in two bearings 3a and 3b. The rotor 4 of the electric motor is surrounded by the stator 5 and fixedly mounted on said shaft between the two turbines, the inductive pick-up 6 being located on the end of the shaft.

It has been assumed in this example that the invention is applied to a gas-turbine power plant, of the type used in aviation for example, and having a combustion chamber g which heats the air under pressure issuing from compressor 1 before being admitted into expansion turbine 7.

The electric motor enables the power plant 1 to 7 to be started and can serve as a generator after startup.

FIGS. 5 and 5a are schematic illustrations of a one-piece rotor in grain-oriented ferrite or any other product having a high coercive force, this rotor being magnetized diametrically and having a pair of poles. With such a rotor 22 mm in diameter and 40 mm long, the Applicant obtained an effective power of 500 W at 40,000 RPM.

FIGS. 6 and 6a portray another diametrically magnetized rotor with a pair of poles, formed by two sintered samarium cobalt sectors 10a and 10b bonded to two plates provided on turbine shaft 2.

FIG. 7 illustrates for exemplary purposes a wiring arrangement in the event of utilization of complementary transistors, the schematic configuration of which was described in French Pat. No. 73 03636 filed Feb. 2, 1973 by Messrs. de VALROGER and LAVET.

The three motor stator windings BM1, BM2 and BM3, which are star-connected on a neutral N, are connected to the common collectors of power transistors T1, T'1, T2, T'2, T3 and T'3, the bases of which are energized by driver transistors t1, t'1, t2, t'2, t3 and t'3. The common bases of the driver transistors are fed by the three pick-up windings bc1, bc2 and bc3 star-connected to neutral n, while their common emitters e1, e2 and e3 are connected to three resistors bm1, bm2 and bm3 star-connected to a neutral n'.

By causing these three resistors to vary, the amount of current delivered to the bases of the six transistors T and T' can be adjusted. However, this invention provides for replacing these three resistors with recovery windings bm1, bm2 and bm3, made of relatively fine-gauge wire and parallel-connected with the heavy-gauge motor windings BM1, BM2 and BM3 in the motor stator. As the speed of the motor rises, the voltage of the current generated by the three pick-up windings bc1, bc2 and bc3 increases and tends to oversaturate transistors T and T'. But in that event there will be a parallel increase in the back electromotive voltage developed in recovery windings bm1, bm2 and bm3, thereby producing a compensating effect whereby the bases of power transistors T1, T'1, T2, T'2, T3 and T'3 are energized uniformly. Furthermore, the base currents are no longer lost, as is the case when three resistors are connected. The currents flowing in these compensating windings provide a supplemental driving effect which is a welcome addition to the main driving effect.

Furthermore, in combination with its other provisions, the present invention provides for connecting, between the emitters and collectors of the six power transistors T1, T'1, T2, T'2, T3 and T'3, six high-speed diodes D1, D'1, D2, D'2, D3 and D'3 which enable the motor to function with an inverse mode capability, that is as a generator without harm to the transistors. This makes it possible to return to the power supply the intense current which may develop when engine speed is rapidly reduced, and the greater the inertia of the components driven by the motor the heavier will be this current.

According to the present invention, however, the effect of these diodes is to avoid overvoltages at the collectors C1, C2 and C3 when a transistor is blocked. Thus when T'3 transits from saturation to the blocking state, the current that flowed in winding BM3 from N to C3 is cut off. The kinetic energy $\frac{1}{2} Li^2$, which is stored in the winding BM3 of inductor L will be converted into potential energy which manifests itself in the form of an overvoltage at C3. However, through the agency of diodes D (in this case D3), this overvoltage will flow towards the supply source of voltage U and the overvoltage at C3 will consequently not exceed this value.

Lastly the invention provides for replacing the six resistors customarily connected between the emitters and the base of the power transistors with inductors l1, l'1, l2, l'2, l3 and l'3. When one of the T or T' transistors is saturated through energizing its base with a current i, a quantity of kinetic energy $\frac{1}{2} li^2$ is stored in that inductor. When the transistor is blocked by eliminating this supply, the kinetic energy in question causes an overvoltage on the base of the transistor. This overvoltage, which is positive in the case of PNP transistors, and negative in the case of NPN transistors, happens to operate in the correct sense needed to block the transistor more rapidly.

I claim:

1. Motor-and-generator assembly, comprising:
   a rotary fluid compression and/or expansion machine having a stationary casing and a bladed turbo-section encased therein and integral with a rotating shaft journalled in a bearing for accurate centering of said turbo-section with minimal clearance between the rotary blades thereof and the adjacent portion of said stationary casing, and
   a battery-feedable direct-current brushless electric motor unit having a rotor integral with said rotating shaft and carrying permanent magnets, a stator carrying electric windings and surrounding said rotor with a high tolerance air-gap and centering therebetween compared with the clearance and centering between said machine casing and turbo-section, a transistorized electronic circuit for electric commutation of said stator windings, and rotor speed sensing means for the control of said electronic circuit, whereby said electric motor has a self-synchronous operation.

2. Motor-and-generator assembly as claimed in claim 1 and operatively associated with an internal combustion engine designed for powering an automobile equipped with a battery, wherein said rotary expansion machine is an air compressor driven by said battery-feedable electric motor and discharging into said internal combustion engine to supercharge the same.

3. Motor-and-generator assembly as claimed in claim 2, further comprising a gas expansion turbine mounted on said rotating shaft and fed with exhaust gases issuing from said internal combustion engine.

4. Motor-and-generator assembly as claimed in claim 3, wherein said bearing is located intermediate said air compressor and said gas expansion turbine.

5. Motor-and-generator assembly as claimed in claim 4, wherein said electric motor is located endwise of said rotating shaft at one side of a group formed by said air compressor and said gas expansion turbine.

6. Motor-and-generator assembly as claimed in claim 4, wherein said electric motor is located intermediate said air compressor and said gas expansion turbine.

7. Motor-and-generator assembly as claimed in claim 2, wherein said rotor speed sensing means is located endwise of said rotating shaft.

* * * * *